United States Patent [19]

Williams

[11] 4,047,483
[45] Sept. 13, 1977

[54] INITIATOR FOR USE IN LASER BEAM IGNITION OF SOLID PROPELLANTS

[75] Inventor: Nathan P. Williams, Huntsville, Ala.

[73] Assignee: The United States of America as represented by the Secretary of the Army, Washington, D.C.

[21] Appl. No.: 670,012

[22] Filed: Mar. 24, 1976

[51] Int. Cl.² ............................................. F23Q 13/00
[52] U.S. Cl. .............................. 102/70.2 A; 102/49.7; 60/256
[58] Field of Search ........................ 102/49.7, 70.2 A; 60/39.82 R, 256

[56] References Cited

U.S. PATENT DOCUMENTS

| 2,828,692 | 4/1958 | Webster | 102/70.2 A |
| 3,362,329 | 1/1968 | Epstein | 102/70.2 A |

Primary Examiner—Verlin R. Pendegrass
Attorney, Agent, or Firm—Nathan Edelberg; Robert P. Gibson; Hugh P. Nicholson

[57] ABSTRACT

An initiator that produces an intermediate combustion step in a system for igniting solid rocket propellant with a laser beam. The initiator comprises a pyrotechnic pellet which has a concave conical surface and a breakaway/burn center section. The pellet is positioned in a container which has a window. A laser beam is directed through the window, onto the conical surface, and initiates combustion of the pellet. The container restrains the pellet from moving during combustion.

2 Claims, 4 Drawing Figures

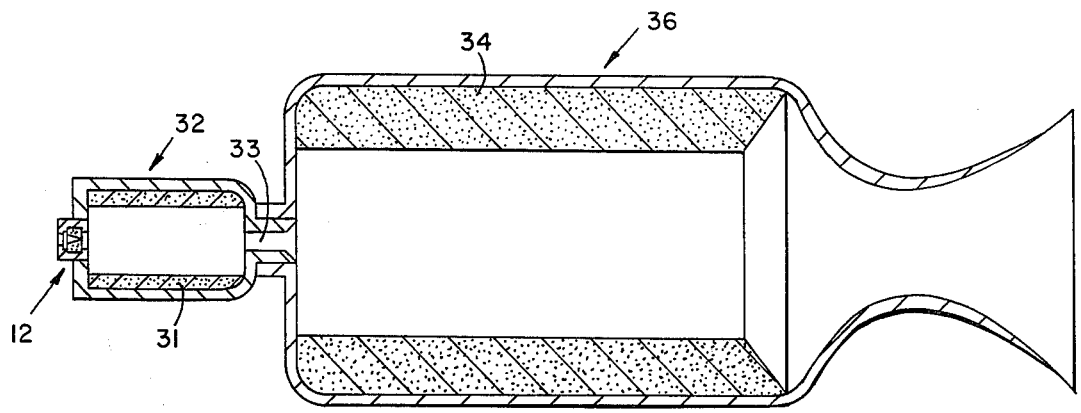
FIG. 1
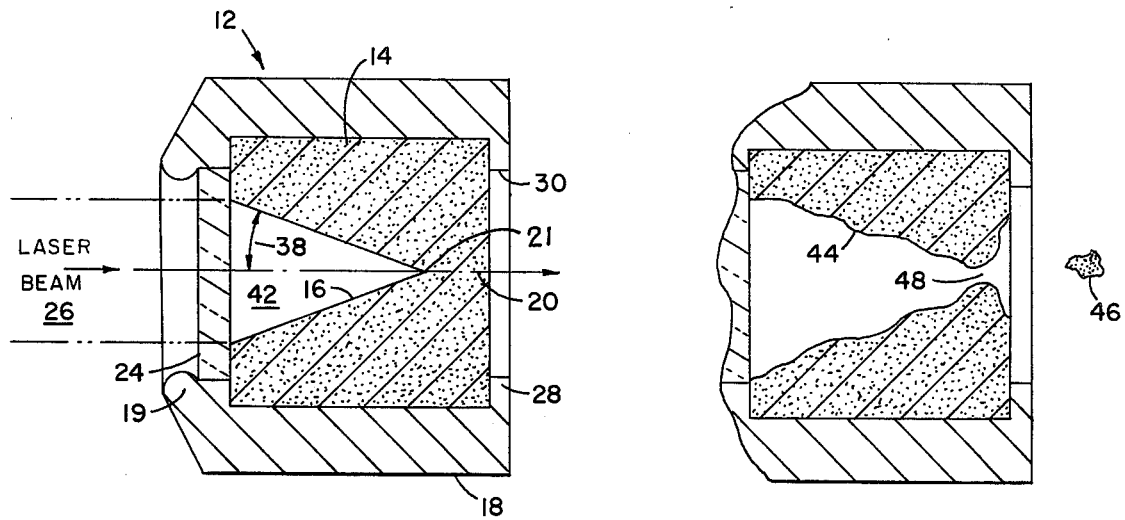
FIG. 2
FIG. 4
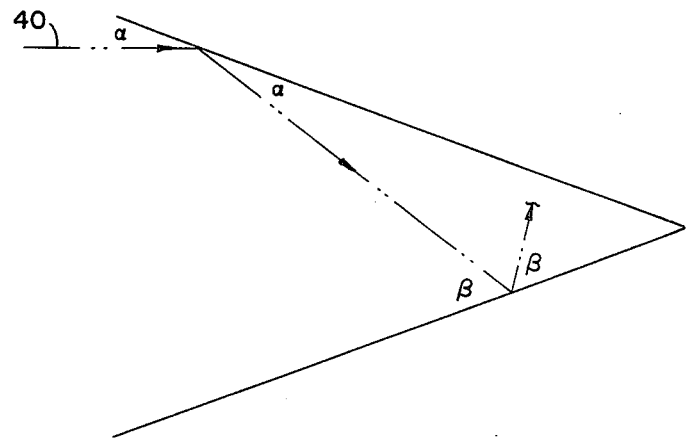
FIG. 3

INITIATOR FOR USE IN LASER BEAM IGNITION OF SOLID PROPELLANTS

DEDICATORY CLAUSE

The invention described herein may be manufactured, used, and licensed by or for Government for governmental purposes without the payment to me of royalties thereon.

BACKGROUND OF THE INVENTION

This invention pertains generally to the ignition of solid rocket propellant and more particularly to the initiator that produces an intermediate combustion step in a system for igniting propellant with a laser beam.

The conventional intermediate combustion source in a system for igniting a solid propellant with a laser beam is a round pyrotechnic pellet that is flat on top and bottom. One of the flat sides of the pellet is placed against a window in a container that holds the pellet and a laser beam is directed through the window onto the pellet, thereby igniting the pellet. The combustion products from the pellet initiate combustion of other materials if an igniter which in turn produce other combustion products which flow from the igniter onto the main mass of propellant being ignited. An alternative to this last step is for the combustion products from the pellet to flow directly onto the main mass of propellant being ignited.

The flat sided pellet used in this system has been found to produce undesirable results. Burning rate cannot be controlled within the desired limits and pellets with highly reflective surfaces may not absorb sufficient energy from the laser beam to initiate combustion within the desirable time of 15 microseconds. Pellets of fast burning pyrotechnic material produce high initial pressure between the pellet and the laser entrance window that can cause the window to break. If a thicker window is used in an attempt to overcome this breakage, the additional thickness attenuates the laser energy that gets to the pellet, thus reducing the efficiency of combustion initiation by the beam. When the window is thick enough to successfully resist breaking, the high initial pressure between the window and the pellet surface can cause the uncombusted portion of the pellet to be fractured and blown from its container. The flying pieces of pellet can damage the igniter or motor, and adversely affect ignition efficiency. The sudden drop in pressure that occurs because of the fracture of the pellet can cause combustion to be extinguished.

Application of the present invention in igniting solid propellants with laser beams has demonstrated that the invention overcomes all of the aforementioned shortcomings of the flat sided pellet.

SUMMARY OF THE INVENTION

The object of this invention is to initiate combustion of a solid propellant by directing a laser beam onto a pyrotechnic pellet which has a concave, conical surface. Slow initiation or failure of the pellet to combust due to reflection of the laser beam off of the pellet surface does not occur since the conical surface reflects and concentrates the laser energy toward the center of the cone. Combustion of the pellet proceeds uniformly from the conical surface to the outer walls and through the blowout/burn section of the pellet. The blowout/burn section allows a throttled release of the initial pressure buildup within the conical space before the pressure reaches a point that would cause severe rupture of the pellet or would break the window through which the laser beam enters. Extinction of combustion of the pellet due to an abrupt decreases in pressure is precluded since the pressure drop in the conical area is gradual.

This invention has proven successful in actual application.

BRIEF DESCRIPTION OF THE DRAWING

FIG. 1 is a sectional view in accordance with this invention illustrating an intitiator attached to an igniter which is attached to a solid propellant rocket motor.

FIG. 2 illustrates an enlarged sectional view of the initiator.

FIG. 3 illustrates a laser beam being reflected off of the concave conical surface of the pellet used in the initiator.

FIG. 4 illustrates the initiator after partial combustion of the pellet, including a detached blowout/burn section.

DESCRIPTION OF THE PREFERRED EMBODIMENT

Referring to FIG. 2, an initiator 12 is shown having a round pyrotechnic pellet 14 with a concave conical surface 16, said conical surface being designed to utilize a maximum of the laser beam energy, allowing a minimum of reflections from the surface to escape, and forming a pressure chamber that offers a maximum surface area for initial ignition and for sustaining initial burning. The pellet has a flat side which is opposite the conical surface. The pellet is housed in a tubular container 18 normally made of metal having a rim 19 and a lip 28. The pellet has a breakaway/burn section 20 which is formed by a thin web of pyrotechnic material which separates the flat side of the pellet from the conical surface and is located at the tip of the conical surface 16 and which maintains initial cone pressure build-up to sustain preliminary ignition and burning. The thickness of this section can be varied to control the amount of pressure pushing against transparent window 24, and to prevent the pressure in conical space from becoming so high that when the section opens the pressure drop will cause the burning surface to extinguish. The section will open after ignition occurs and will allow the pellet to burn without pellet break-up or blow out of chunks into an igniter 32 or motor 36 at FIG. 1.

Referring back to FIG. 2, affixed to the container wall is the transparent window 24 through which a laser beam 26 can be directed onto the concave surface. The lip 28 which prevents the pellet from moving out of the container during combustion has an orifice 30 through which passes the combustion products of the pellet. These products ignite the combustible material 31 in the igniter 32, of FIG. 1, which in turn produce hot gases which pass through igniter port 33 and ignite a propellant 34 in the rocket motor 36.

A pellet of this configuration can be produced from a wide variety of pyrotechnic materials. Two materials which have been used satisfactorily to make them are zirconium/potassium perchlorate and boron/potassium nitrate. The pellets are formed by pressing the pyrotechnic material into the container with a cone-shaped punch. After forming, the glass window 24 is placed on the pellet and the edges sealed to the container with a cement and said rim 19 is crimped to assist in holding the window in place.

A typical initiator pellet has a conical surface angle 38 at FIG. 2, of 30° with the centerline off the pellet. The conical surface is 0.25 inch in diameter at its opening. The outer diameter of the pellet is 0.375 inch. The thickness of the breakaway/burn section from the point of the cone to the flat side of the pellet is 0.075 inch. The pellet starts combustion near the point of the cone in 10 microseconds after the laser beam shines on it. Total combustion of the pellet occurs in 100 milliseconds.

The events that occur during the combustion of this pellet illustrate how it overcomes the weaknesses of the conventional pellet which has a flat surface against the laser beam window. The problem of the laser beam being reflected away from rather than being absorbed into a pellet is reduced because of the angle of the conical surface wall. As illustrated at FIG. 3, laser beam rays 40 that reflect off of the pellet surface are sent deeper toward the point of the cone rather than away from the pellet. This causes the energy to be concentrated and the initial ignition to take place near the point of the conical surface.

At FIG. 2, the angle 38 of the conical surface with the centerline of the pellet is critical in that an angle of 45° or more will not cause rays of a laser beam that are parallel with the pellet centerline to be reflected toward the point of the cone. Angles of less than 45° will result in the rays being reflected toward the cone, with the concentration of the rays near the point being inversely related to the largeness of the angle.

The space 42 at FIG. 2, within the conical surface, provides a volume into which the initial combustion gases can expand. Even though there is a fast buildup of pressure within this space, an occurrence which is needed to sustain combustion, the pressure rise is not so fast and sudden as it would be if the pellet had a flat wall against the window with no free volume into which to expand. The pressure created in the conical space of the invention pellet is not great enough to cause the window to break or the pellet to be severely fractured and blown out of the container.

As the pellet internal surface 44 at FIG. 4 burns, an opening occurs when a small piece of the pellet 46 breaks away or else the section burns through without there being any breakaway. If breakaway occurs, the piece of the pellet that is blown from the main mass is so small that it does not cause any damage to the igniter or motor that it might go into.

The opening 48 in the pellet allows throttled release of the combustion gases. Since the opening is initially very small, the pressure in the conical space is released slowly to a more or less steady state condition. There is no sharp drop in pressure which would cause combustion to be extinguished. This results in complete combustion of the initiator pellet.

I claim:

1. In a laser activated initiator for igniting solid propellants having a tubular container, a transparent window secured to said container at the rim of said container, a pyrotechnic pellet housed in said container, said pellet having a surface on which combustion is initiated, and a laser beam which shines through said transparent window onto said surface of said pyrotechnic pellet, the improvement: wherein said pellet has a flat side opposite said surface and said surface of said pellet is concave and generally conical ending in a tip with the tip being adjacent said flat side and separated therefrom by a thin web of pyrotechnic material forming a breakaway/burn section, whereby rays of said laser beam striking said surface tend to be reflected off of said surface wall toward the tip of said surface, the energy from said laser beam thus being concentrated at said tip and insuring ignition of said pellet on or near the top of said surface.

2. An initiator as set forth in claim 1 with said conical surface being shaped so that any straight line extending from the point of said conical surface along said surface forms an angle with the centerline of the space within said conical surface that is less than 45°.

* * * * *